United States Patent
Kobayashi

(10) Patent No.: US 9,369,633 B2
(45) Date of Patent: Jun. 14, 2016

(54) IMAGING APPARATUS, CONTROL METHOD, AND STORAGE MEDIUM STORING PROGRAM

(71) Applicant: CANON KABUSHIKI KAISHA, Tokyo (JP)

(72) Inventor: Yoshihiro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 14/221,532

(22) Filed: Mar. 21, 2014

(65) Prior Publication Data

US 2014/0293109 A1    Oct. 2, 2014

(30) Foreign Application Priority Data

Mar. 27, 2013  (JP) ................. 2013-066838
Jan. 10, 2014  (JP) ................. 2014-003740

(51) Int. Cl.
*H04N 5/232*   (2006.01)
*H04N 5/235*   (2006.01)

(52) U.S. Cl.
CPC ....... *H04N 5/23293* (2013.01); *H04N 5/23222* (2013.01); *H04N 5/23245* (2013.01); *H04N 5/235* (2013.01); *H04N 5/23212* (2013.01)

(58) Field of Classification Search
CPC ... H04N 5/23293; H04N 5/772; H04N 5/232; H04N 2101/00; H04N 1/2112
USPC .................................................... 348/333.02
See application file for complete search history.

(56) References Cited

U.S. PATENT DOCUMENTS

| | | | | |
|---|---|---|---|---|
| 7,511,757 B2* | 3/2009 | Mokunaka et al. | ........... | 348/335 |
| 2006/0263066 A1* | 11/2006 | Matsumoto | ............ | H04N 5/232 386/224 |
| 2010/0066888 A1* | 3/2010 | Nakai | ...................... | G03B 7/26 348/333.01 |
| 2012/0134642 A1* | 5/2012 | Okamura | ........... | H04N 5/23293 386/230 |
| 2014/0002691 A1* | 1/2014 | Masugi | .............. | H04N 5/23293 348/223.1 |
| 2014/0293109 A1* | 10/2014 | Kobayashi | .............. | 348/333.02 |

FOREIGN PATENT DOCUMENTS

JP    2003-309745 A    10/2003

* cited by examiner

*Primary Examiner* — Twyler Haskins
*Assistant Examiner* — Fayez Bhuiyan
(74) *Attorney, Agent, or Firm* — Canon U.S.A., Inc. IP Division

(57) ABSTRACT

The present invention is provided to maintain a photographable display state so as not to miss a photo opportunity when a photographer performs preparation work before shooting or confirmation work after shooting, and also smoothly switch to a display state in which the photographer can perform the confirmation work after shooting whenever necessary. A live view image is displayed on a first display screen when an eye contact state is detected at the eyepiece viewfinder, and a captured image is displayed on a second display screen when a non-eye-contact state is detected after receiving an image shooting instruction. When the eye contact state is not detected within a first period from detecting the non-eye-contact state, displaying the live view image on the first display screen is stopped. The live view image is displayed on the first display screen during the first period after detecting the non-eye-contact state.

5 Claims, 5 Drawing Sheets

IMAGING APPARATUS, CONTROL METHOD, AND STORAGE MEDIUM STORING PROGRAM

BACKGROUND OF THE INVENTION

1. Field of the Invention

The present invention present invention relates to an imaging apparatus including an eyepiece viewfinder and provided with a plurality of display panels, a control method, and a storage medium storing a program.

2. Description of the Related Art

In a digital camera including a display unit such as a liquid crystal panel, a captured image can be displayed and confirmed on the liquid crystal panel. This kind of the digital camera is generally provided with a REC review function to display the captured image for a prescribed period on the liquid crystal panel or the like immediately after capturing the image.

Also, in recent years, a digital camera including an electronic viewfinder formed of a liquid crystal panel or the like is getting popular instead of an optical viewfinder due to the technology advancement such as miniaturization and high definition in the liquid crystal panel. The digital camera including the electronic viewfinder is provided with a commonly-used liquid crystal panel or the like on a back surface of the camera in addition to the electronic viewfinder. In this type of the digital camera, the two display units can be selectively used depending on necessity.

For example, Japanese Patent Laid-Open No. 2003-309745 discloses a technology of a digital camera including two display units, in which a live view image is displayed on one of the display units and a review image is displayed on the other display unit in accordance with an eye contact state with respect to the one of the display units.

However, according to the technology disclosed in the above-described Japanese Patent Application Laid-Open No. 2003-309745, displaying the live view image on the electronic viewfinder is stopped when a non-eye-contact state is detected. Therefore, when a user wishes to capture an image again after displaying the live view image is stopped, it is necessary to redisplay the live view image on the electronic viewfinder. Thus, in this technology, there is a problem in that the user may miss a next photo opportunity because a certain time is necessary to restart the display on the electronic viewfinder and it takes a certain period for the digital camera to transition to a photographable state.

SUMMARY OF THE INVENTION

The present invention is made in view of the above problem, and the object of the present invention is to maintain a photographable display state so as not to miss a photo opportunity when a photographer performs preparation work before shooting or confirmation work after shooting. Further, the present invention is made to smoothly switch to a display state in which the photographer can perform the confirmation work after shooting whenever necessary.

Further features of the present invention will become apparent from the following description of exemplary embodiments (with reference to the attached drawings).

DESCRIPTION OF THE EMBODIMENTS

First Embodiment

An embodiment according to the present invention will be described below with reference to drawings.

Figure 1:
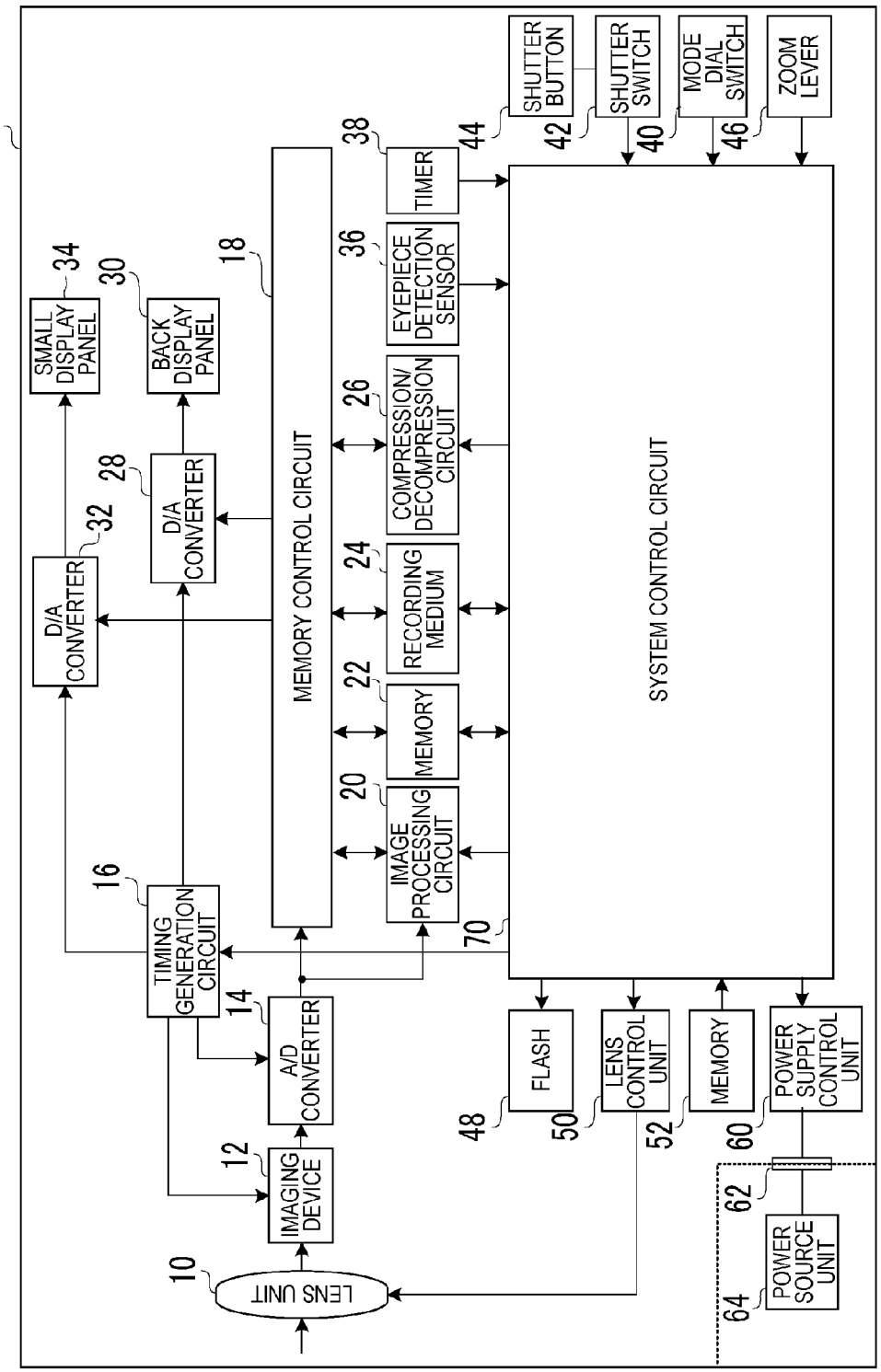
FIG. 1 is a diagram illustrating an exemplary embodiment of a configuration of an imaging apparatus.

FIG. 1 is a diagram illustrating an imaging apparatus 100. A lens unit 10 includes a zoom mechanism, a stop mechanism and so on. An imaging device 12 converts an optical image to an electrical signal. An example of the imaging device 12 is a CCD device. An A/D converter 14 converts an analog output signal of the imaging device 12 to a digital signal. A timing generation circuit 16 supplies a clock signal and a control signal to the imaging device 12, the A/D converter 14, and D/A converters 28 and 32. The timing generation circuit 16 is controlled by a system control circuit 70 which will be described below.

A memory control circuit 18 controls data transfer among the A/D converter 14, an image processing circuit 20, memory 22, a recording medium 24, a compression/decompression circuit 26, and the D/A converters 28 and 32. The data output from the A/D converter 14 is written in the memory 22 or the recording medium 24 via the image processing circuit 20 and the memory control circuit 18, or only via the memory control circuit 18 without via the image processing circuit 20.

The image processing circuit 20 applies image processing, such as pixel interpolation processing and color conversion processing, to the data output from the A/D converter 14 and the data output from the memory control circuit 18. The memory 22 is used as a work space at the time of applying the image processing or compressing/decompressing to a still image and a moving image that have been captured, and also used as a write area for writing display image data. The memory 22 is built inside the imaging apparatus 100. The memory 22 has a sufficient recording capacity for storing a prescribed number of the still images and the moving image having a time length of a determination time. Further, the memory 22 may be used as the work area for the system control circuit 70.

Examples of the recording medium 24 are a memory card, a hard disk, etc. for recording the compressed image data. More specifically, the recording medium 24 is a semiconductor memory, a magnetic disk, or the like. The recording medium 24 may be built inside the imaging apparatus 100, and also may be detachably and articulately connected to the imaging apparatus 100 as another example.

The compression/decompression circuit 26 is configured to compress or decompress the image data, for example, by JPEG compression and the like. The compression/decompression circuit 26 reads the image data stored in the recording medium 24 and applies the compression processing or decompression processing to the image data, and writes the processed data in the memory 22. The D/A converter 28 converts the digital signal to the analog signal. A back display panel 30 may be either a fixed or movable type, formed of an LCD, for example. The back display panel 30 is disposed on a back surface of the imaging apparatus 100 and positioned outside an eyepiece viewfinder.

The image data for displaying stored in the memory 22 is transmitted to the back display panel 30 via the D/A converter 28. The back display panel 30 displays the received image data. More specifically, the back display panel 30 displays a live view image or a REC review image. Here, the live view image is a moving image which displays the captured image imaged by the imaging device 12 in real time. Note that the live view image may also be a still image timely imaged by the imaging device 12. The live view image is an example of a real-time image.

The REC review image is a captured image imaged by the imaging device 12 in the past imaging process and recorded in the memory 22. Also, the REC review image may be an image used for the user to confirm the image captured by the imaging apparatus 100 and recorded in the recording medium 24. The REC review image may be either a moving image or a still image. The REC review image is an example of the recorded image.

The D/A converter 32 converts a digital signal to an analog signal. An example of the small display panel 34 is an LCD. The small display panel 34 is disposed inside the eyepiece viewfinder of the imaging apparatus 100.

The image data recorded for display in the memory 22 is transmitted to the small display panel 34 via the D/A converter 32. The small display panel 34 displays the live view image or the REC review image. Note that the small display panel 34 is an example of a first display screen. Further, the back display panel 30 is an example of a second display screen.

The imaging apparatus 100 implements an electronic viewfinder function by sequentially displaying the captured images, using the back display panel 30 and the small display panel 34. Further, the back display panel 30 and the small display panel 34 suitably display information necessary for the imaging process, such as an in-focus indication, a camera shake warning indication, a flash charging display, a shutter speed indication, an aperture value indication, and an exposure correction display.

An eyepiece detection sensor 36 is, for example, an infrared ray sensor. The eyepiece detection sensor 36 detects whether a state at the eyepiece viewfinder is an eye contact state. Here, note that the eye contact state is a state in which the eyepiece detection sensor 36 detects that a user of the imaging apparatus 100 looking into the small display panel 34 disposed inside the eyepiece viewfinder. On the other hand, a state other than the eye contact state, in which the eyepiece detection sensor 36 detects no user's eye looking into the eyepiece viewfinder, is called a non-eye-contact state.

A timer 38 measures various kinds of periods. For example, the timer 38 measures a period from when a system control circuit 70 which will be described below receives an image shooting instruction input from the user until when the state at the eyepiece viewfinder turns to the non-eye-contact state, a period from when displaying the REC review image is started until when the non-eye-contact state continues, and so on.

A mode dial switch 40 is a user interface for switching a function mode of the imaging apparatus 100. The user can switch the function mode by operating the mode dial switch 40. The imaging apparatus 100 according to the present embodiment includes the function modes such as a power-off, an automatic imaging mode, a manual imaging mode, a panorama imaging mode, a reproducing mode, and a moving image mode.

A shutter switch 42 instructs to start operations related to imaging by operating halfway a shutter button 44 (by half-pressing the shutter button). As the operations related to imaging, AF (autofocus) processing, AE (automatic exposure) processing, AWB (automatic white balance) processing, EF (flash preliminary light emission) processing may be listed.

The system control circuit 70 performs exposure processing upon detecting a full operation of the shutter button 44 (full-pressing, that is, the user's instruction). In the exposure processing, the system control circuit 70 instructs the A/D converter 14 to start converting a signal output from the imaging device to a digital signal. Then, the system control circuit 70 stores the captured image converted as the digital signal in the memory 22 via the memory control circuit 18.

After the exposure processing, the system control circuit 70 instructs a start of a series of imaging processes, such as development processing, compression processing, and recording processing. Here, note that the development processing is executed in the system control circuit 70 and image processing circuit 20. The compression processing is executed in the system control circuit 70 and compression/decompression circuit 26. The recording processing is the process to write the compressed image data in the recording medium 24 and executed by the system control circuit 70.

A zoom lever 46 receives a zooming operation executed by the user. The zoom lever 46 transmits the instructions to perform zooming motion and electronic zoom magnification for the lens unit 10 to the system control circuit 70.

A flash 48 follows the instructions from the system control circuit 70 and performs AF auxiliary light projector function and flash dimming control. A lens control unit 50 controls the lens unit 10. More specifically, the lens control unit 50 follows the instructions from the system control circuit 70 and performs controls for the lens unit 10, such as focus control, zoom control, and controls of the aperture value and shutter speed. The memory 52 stores a constant, a variable, a program, etc. to be referred when the system control circuit 70 actuates.

A power supply control unit 60 includes, for example, a battery detecting circuit, a DC-DC converter, a switch circuit to switch a block to be energized, and so on. The power supply control unit 60 detects whether a battery is mounted on the imaging apparatus 100, and detects a type of the battery and a remaining battery level. The power supply control unit 60 controls the DC-DC converter based on the detection result and the instruction from the system control circuit 70, and supplies the necessary voltage to each component for a necessary period.

A power source unit 64 is connected to the power supply control unit 60 with a connector 62. Examples of the power source unit 64 are a primary battery such as an alkaline battery and a lithium battery, a secondary battery such as a Li battery, and an AC adapter.

A system control circuit 70 controls the imaging apparatus 100. The system control circuit 70 controls the display states on the back display panel 30 and the small display panel 34 based on, for example, information output from the eyepiece detection sensor 36 and the timer 38.

Figure 2:
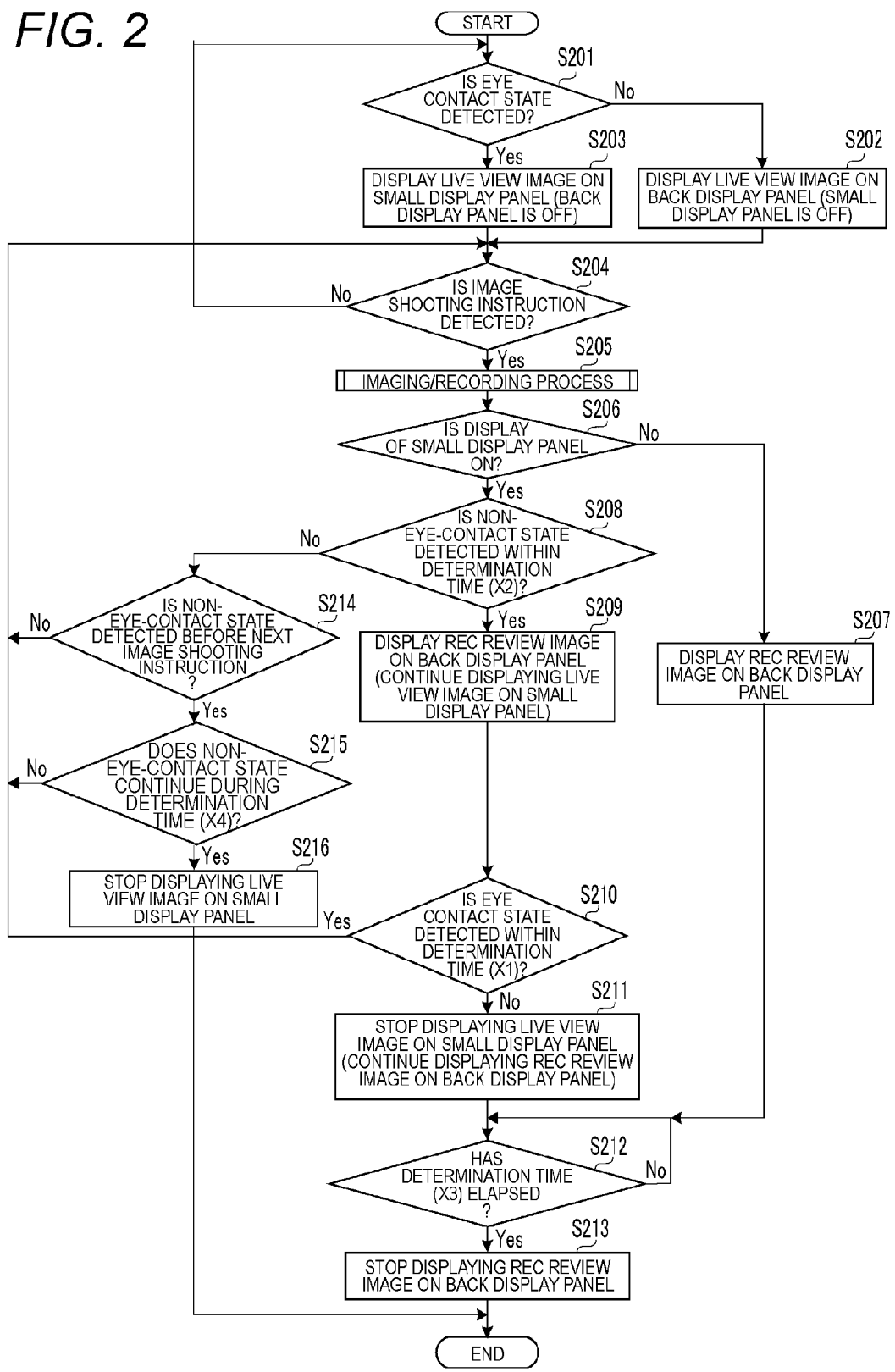
FIG. 2 is a flowchart illustrating display processing in the imaging apparatus.

FIG. 2 is a flowchart illustrating display processing by the imaging apparatus 100. The imaging apparatus 100 controls the displays on the back display panel 30 and the small display panel 34 through the display processing. In step S201, when the power is supplied to the imaging apparatus 100, the system control circuit 70 determines whether the state at the eyepiece viewfinder is the eye contact state. More specifically, the system control circuit 70 obtains a detection result from the eyepiece detection sensor 36 and determines whether the state at the eyepiece viewfinder is the eye contact state or the non-eye-contact state based on the obtained detection result.

In step S201, in the case of determining that the state at the eyepiece viewfinder is the non-eye-contact state which is not the eye contact state, the system control circuit 70 proceeds to the processing in step S202. In step S202, the system control circuit 70 displays a live view image on the back display panel 30.

More specifically, the system control circuit 70 obtains the live view image captured by the imaging device 12 via the lens unit 10. Then, the live view image is converted to the digital signal by the A/D converter 14 under control of the system control circuit 70, and subsequently the image processing is applied at the image processing circuit 20. After that, the live view image after the image processing is converted to the analog signal by the D/A converter 28 under control of the system control circuit 70, and then displayed on the back display panel 30.

Meanwhile, the system control circuit 70 controls the display state of the small display panel 34 to be OFF in step S202. After the processing in step S202, the system control circuit 70 proceeds to the processing in step S204.

In the case of determining that the state at the eyepiece viewfinder is the eye contact state in step S201, the system control circuit 70 proceeds to the processing in step S203. In step S203, the system control circuit 70 displays the live view image on the small display panel 34.

More specifically, the system control circuit obtains the live view image and applies the image processing and the like to the live view image in the same manner as described in step S202. The live view image after the image processing is converted to the analog signal by the D/A converter 32 under control of the system control circuit 70, and then displayed on the small display panel 34.

Meanwhile, in step S203, the system control circuit 70 controls the display state of the back display panel 30 to be OFF. After the processing in step S203, the system control circuit 70 proceeds to the processing in step S204.

In step S204, the system control circuit 70 determines whether the user has input an image shooting instruction. More specifically, the system control circuit 70 monitors a state of the shutter switch 42 and determines whether the user has input the image shooting instruction to record the captured image on the recording medium by pressing the shutter button 44.

In step S204, in the case of detecting an input of the image shooting instruction, the system control circuit 70 receives the input of the image shooting instruction and proceeds to the processing in step S205. In the case of not detecting any input of the image shooting instruction, the system control circuit 70 proceeds to the processing in step S201.

In step S205, the system control circuit 70 obtains the captured image through the imaging process. Subsequently, the system control circuit 70 records the captured image on the recording medium 24. More specifically, the system control circuit 70 obtains the image data via the lens unit 10, imaging device 12, and A/D converter 14. Here, note that the image data may be either the still image or the moving image. After that, the system control circuit 70 applies the image processing such as the pixel interpolation processing and the color conversion processing to the image data at the image processing circuit 20. Then, the system control circuit 70 records, on the recording medium 24, the data compressed at the compression/decompression circuit 26, for example, by JPEG compression.

Next, in step S206, the system control circuit determines whether the display state of the small display panel 34 is ON. In the case of determining that the display state of the small display panel 34 is not ON in step S206, the system control circuit 70 proceeds to the processing in step S207. In step S207, the system control circuit 70 displays the REC review image on the back display panel 30. More specifically, the system control circuit 70 displays the recorded image captured and stored in the recording medium 24 in step S205 as the REC review image.

On the other hand, in the case of determining that the display state of the small display panel 34 is ON in step S206, the system control circuit 70 proceeds to the processing in step S208. In step S208, the system control circuit 70 determines, based on the detection result by the eyepiece detection sensor 36, whether the non-eye-contact state is detected within a determination time (X2) from the time point of receiving the image shooting instruction. Here, note that the determination time (X2) is a period preset to determine whether to display the REC review image on the back display panel 30. The determination time (X2) is an example of a second period.

In the case of determining that the non-eye-contact state is detected in step S208, the system control circuit 70 proceeds to the processing in step S209. In step S209, the system control circuit 70 displays the REC review image on the back display panel 30. At this point, note that the system control circuit 70 continues displaying the live view image on the small display panel 34 started in step S203.

Next, in step S210, the system control circuit determines, based on the detection result of the eyepiece detection sensor 36, whether the eye contact state is detected. More specifically, the system control circuit 70 determines whether the eye contact state is detected within a determination time (X1) from the time point of starting to display the REC review view on the back display panel in step S209, i.e., from the time point of detecting the non-eye-contact state. Here, note that the determination time (X1) is a period preset to determine whether to stop displaying the live view image on the small display panel 34. The determination time (X1) is an example of the first period and a fourth period.

In the case of determining that the eye contact state is detected in step S210, the system control circuit 70 stops the display on the back display panel, and proceeds to the processing in step S204. When the processing in step S204 is executed after the processing in step S210, the live view image is continuously displayed on the small display panel 34. Therefore, the user can immediately input an image shooting instruction while viewing the live view image, without feeling any time lag before redisplaying the live view image. In other words, the imaging apparatus 100 is capable of properly starting the imaging process at the user's desired timing.

On the other hand, in the case of not detecting the eye contact state in step S210, i.e., in the case where the non-eye-contact state has continued during the determination time (X1) since detecting of the non-eye-contact state, the system control circuit 70 proceeds to the processing in step S211. In step S211, the system control circuit 70 stops displaying the live view image on the small display panel 34, which was started in step S203. At this point, the system control circuit 70 continues displaying the REC review image on the back display panel, which was started in step S209.

Next, in step S212, the system control circuit determines whether a determination time (X3) has passed from the time point of starting to display the REC review image on the back display panel 30 in step S207 or step S209. Here, note that the determination time (X3) is a period preset to determine whether to stop displaying the REC review image on the back display panel 30.

Incidentally, in the case where that the system control circuit 70 displays the REC review image on the back display panel 30 in step S207, the system control circuit 70 determines whether the determination time (X3) has passed from the time point of displaying the REC review image, i.e., from the time point of detecting the non-eye-contact state. Here, note that the determination time (X3) is a period preset to determine whether to stop displaying the REC review image on the back display panel 30. The determination time (X3) is an example of a third period.

In the case of determining that the determination time (X3) has not passed in step S212, the system control circuit 70 repeatedly executes the processing in step S212 until the determination time (X3) passes. In the case of determining that the determination time (X3) has passed in step S212, the system control circuit 70 proceeds to the processing in step S213.

In step S213, the system control circuit 70 stops displaying the REC review image which was started in step S207 or step S209 and is being displayed on the back display panel 30. At this point, note that the system control circuit 70 may display the live view image on the back display panel 30 in accordance with the user's instruction and the like. Also, in a different case, the system control circuit 70 may stop displaying the REC review image on the back display panel 30 in step S213 and further display the live view image on the back display panel 30.

Further, in the case of determining that the non-eye-contact state is not detected within the determination time (X2) in step S208, the system control circuit 70 proceeds to the processing in step S214. In step S214, the system control circuit 70 determines whether the non-eye-contact state is detected before receiving an input of a next image shooting instruction, continuously based on the detection result of the eyepiece detection sensor 36.

In the case of determining that the non-eye-contact state is not detected in step S214, the system control circuit 70 proceeds to the processing in step S204. In the case of determining that non-eye-contact state is detected in step S214, the system control circuit 70 proceeds to the processing in step S215. In step S215, the system control circuit 70 determines whether the non-eye-contact state continues during the determination time (X4) from the time point of detecting the non-eye-contact state in step S214. Here, note that the determination time (X4) is a period preset to determine whether to stop displaying the live view image on the small display panel 34. The determination time (X4) is an example of a first period.

In the case of determining that the non-eye-contact state does not continue during the determination time (X4) in step S215, the system control circuit 70 proceeds to the processing in step S204. In the case of determining that the non-eye-contact state continues during the determination time (X4) in step S215, the system control circuit 70 proceeds to the processing in step S216. In step S216, the system control circuit 70 stops displaying the live view image on the small display panel 34 which was started in step S203. Thus, the display processing ends.

Note that values of the above determination time (X1 to X4) are optional. For example, a designer or the like may preset appropriate values or suitably change the values for the imaging apparatus 100. Also, the values of the determination time (X1 to X4) may be suitably changed in accordance with an instruction from the user, for example.

Figure 3A:
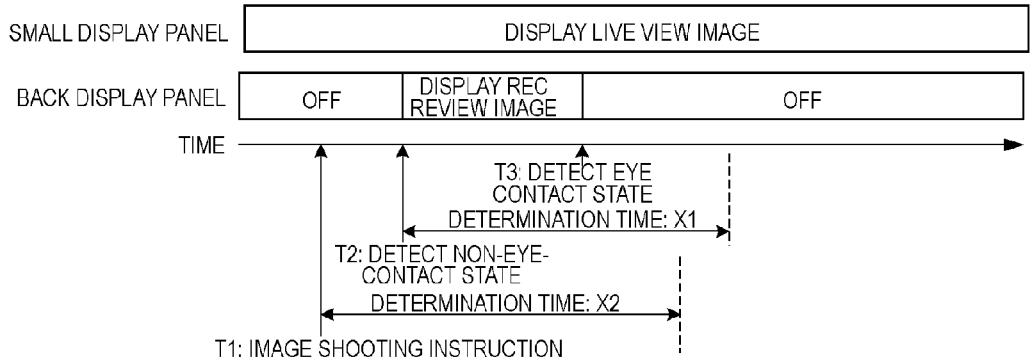
FIGS. 3A to 3D are diagrams for describing display states on display panels of the imaging apparatus.

FIGS. 3A to 3D are diagrams for describing a relation between operation timings to the imaging apparatus 100 by the user and the display states on the small display panel 34 and the back display panel 30. FIG. 3A is a diagram illustrating the display states on the small display panel 34 and the back display panel 30 in a first case.

Here, note that in the first case the user operates as follows. More specifically, the user first executes imaging by using the imaging apparatus 100 with his/her eye brought near the small display panel 34. Subsequently, the user displays a captured image on the back display panel 30 and confirms the captured image. Then, the user executes imaging again with his/her eye brought near the small display panel 34.

In the first case, the user inputs the image shooting instruction via the shutter button 44 at time T1. Next, the user takes his/her eye off the small display panel 34 at time T2. In response to this, the imaging apparatus 100 stops detecting the eye contact state at the eyepiece viewfinder and comes to detect the non-eye-contact state instead. In the first case illustrated in FIG. 3A, the value of the "time T2-time T1" which is a period from receiving the image shooting instruction to detecting the non-eye-contact state at the eyepiece viewfinder is equal to or less than the determination time (X2). Accordingly, establishment conditions in step S208 are satisfied (step S208, Yes) and the system control circuit 70 displays the REC review image on the back display panel 30 at the timing of time T2 in step S209.

After that, when the user brings his/her eye near the small display panel 34 again at time T3, the imaging apparatus 100 detects the eye contact state at the eyepiece viewfinder. Here, the value of "time T3-time T2" which is a period in which the state of the eyepiece viewfinder changes from the non-eye-contact state to the eye contact state is equal to or less than the determination time (X1). Accordingly, the establishment conditions in step S210 are satisfied (step S210, Yes) and the system control circuit 70 stops displaying the REC review image on the back display panel 30 at the timing of time T3 in step S203.

Figure 3B:
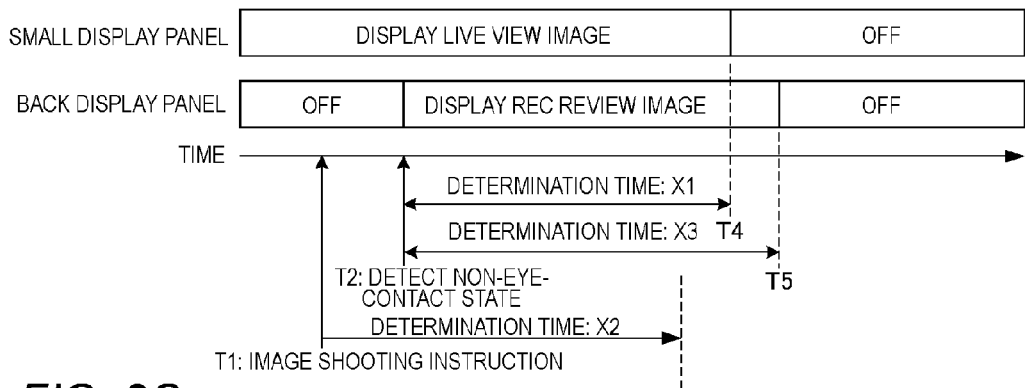

FIG. 3B is a diagram illustrating the display states on the small display panel 34 and the back display panel 30 in a second case. Here, in the second case, the user operates as follows. More specifically, the user first executes imaging by using the imaging apparatus 100 with his/her eye brought near the small display panel 34. Subsequently, the user displays the captured image on the back display panel 30, and afterward quits image-shooting.

In the second case, the imaging apparatus 100 receives an input of the image shooting instruction at time T1 as same as the first case, and detects the non-eye-contact state at time T2. In response to this, the system control circuit 70 displays the REC review image on the back display panel 30 at time T2 (step S208, Yes and proceeding to step S209).

After that, at time T4 when the determination time (X1) has passed from detection of the non-eye-contact state at the eyepiece viewfinder, the value of "time T4-time T2" becomes larger than the determination time (X1). Accordingly, the establishment conditions in step S210 are dissatisfied (step S210, NO) and the system control circuit 70 displays the live view image on the small display panel 34 at the timing of time T4 in step S211.

Further, at time T5 when the determination time (X3) has passed from detection of the non-eye-contact state at the eyepiece viewfinder, the value of "time T5 to time T2" becomes equal to or more than the determination time (X3). Accordingly, the establishment conditions in step S212 are satisfied (step S212, Yes), and the system control circuit 70 stops displaying the REC review image on the back display panel 30 at the timing of time T5 in step 213.

Figure 3C:
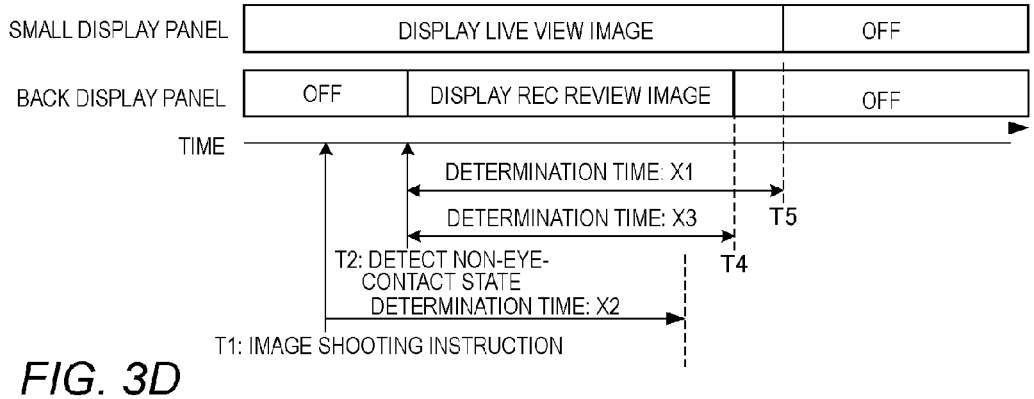

FIG. 3C is a diagram illustrating the display states on small display panel 34 and the back display panel 30 in a third case. Here, the third case is almost the same as the second case, but has a time length relation between the determination time X1 and the determination time X3 different from the second case illustrated in FIG. 3B. Note that the determination time (X1) is shorter than the determination time X3 in the second case while the determination time (X1) is longer than the determination time X3 in the third case.

In the third case, displaying the REC review image on the back display panel 30 is stopped before displaying the live view image on the small display panel 34 is stopped. More specifically, at time T4 when the determination time (X3) has passed from detection of the non-eye-contact state at time T2, the value of "time T4-time T2" becomes equal to or more than the determination time (X3). Accordingly, the establishment conditions in step S210 are satisfied (step S212, Yes). Then, the system control circuit 70 stops displaying the REC review image on the back display panel 30 at the timing of time T4 in step S213.

Subsequently, at time T5 when the determination time (X1) has passed from detection of the non-eye-contact state at the eyepiece viewfinder, the value of "time T5-time T2" becomes equal to or less than the determination time (X1). Accordingly, the establishment conditions in step S210 are dissatisfied (step S210, No). Accordingly, the system control circuit 70 stops displaying the live view image on the small display panel 34 at the timing of time T5 in step S212.

Figure 3D:
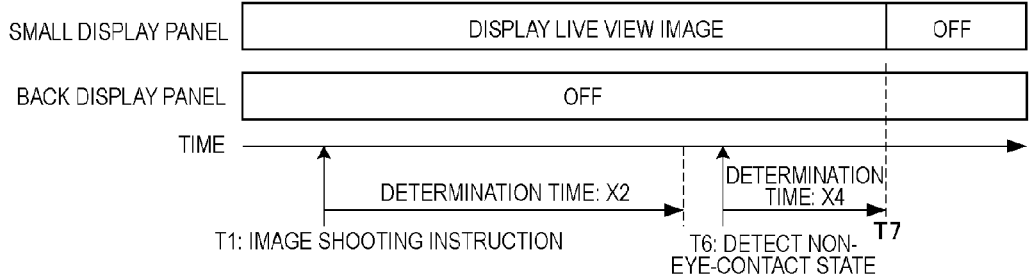

FIG. 3D is a diagram illustrating the display states on the small display panel 34 and the back display panel 30 in a fourth case. Here, in the fourth case, the user waits for a next photo opportunity, keeping his/her eye in the contact state for a while after having captured an image with the imaging apparatus 100, and completes image-shooting afterward.

As illustrated in FIG. 3D, in the case where the non-eye-contact state is detected at time T6 when the determination time (X2) has passed from time T1, the value of "time T6-time T1" becomes equal to or more than the determination time (X2). Accordingly, the establishment conditions in step S208 are dissatisfied (step S208, No) and displaying the live view image on the small display panel 34 is continued. After that, at time T7 when the determination time (X4) has passed from detection of the non-eye-contact state, the value of "time T7-time T6" becomes equal to or more than the determination time (X4). Therefore, establishment conditions in step S215 are satisfied (step S215, Yes), and the system control circuit 70 stops displaying the live view image on the small display panel 34 in step S216.

Thus, the imaging apparatus 100 according to the present embodiment is capable of continuously displaying the live view image on the small display panel 34 while suitably switching the display on the back display panel 30. Therefore, the imaging apparatus 100 enables the user to properly start the imaging process at the user's desired timing.

Note that the system control circuit 70 may include a CPU, a ROM, and so on. In this case, the above-described processes in the imaging apparatus 100 may be implemented by the CPU reading out a program stored in the ROM and executing this program.

Second Embodiment

In the following, a characteristic configuration of the present embodiment will be described in detail while omitting the configuration same as the first embodiment.

Figure 4:
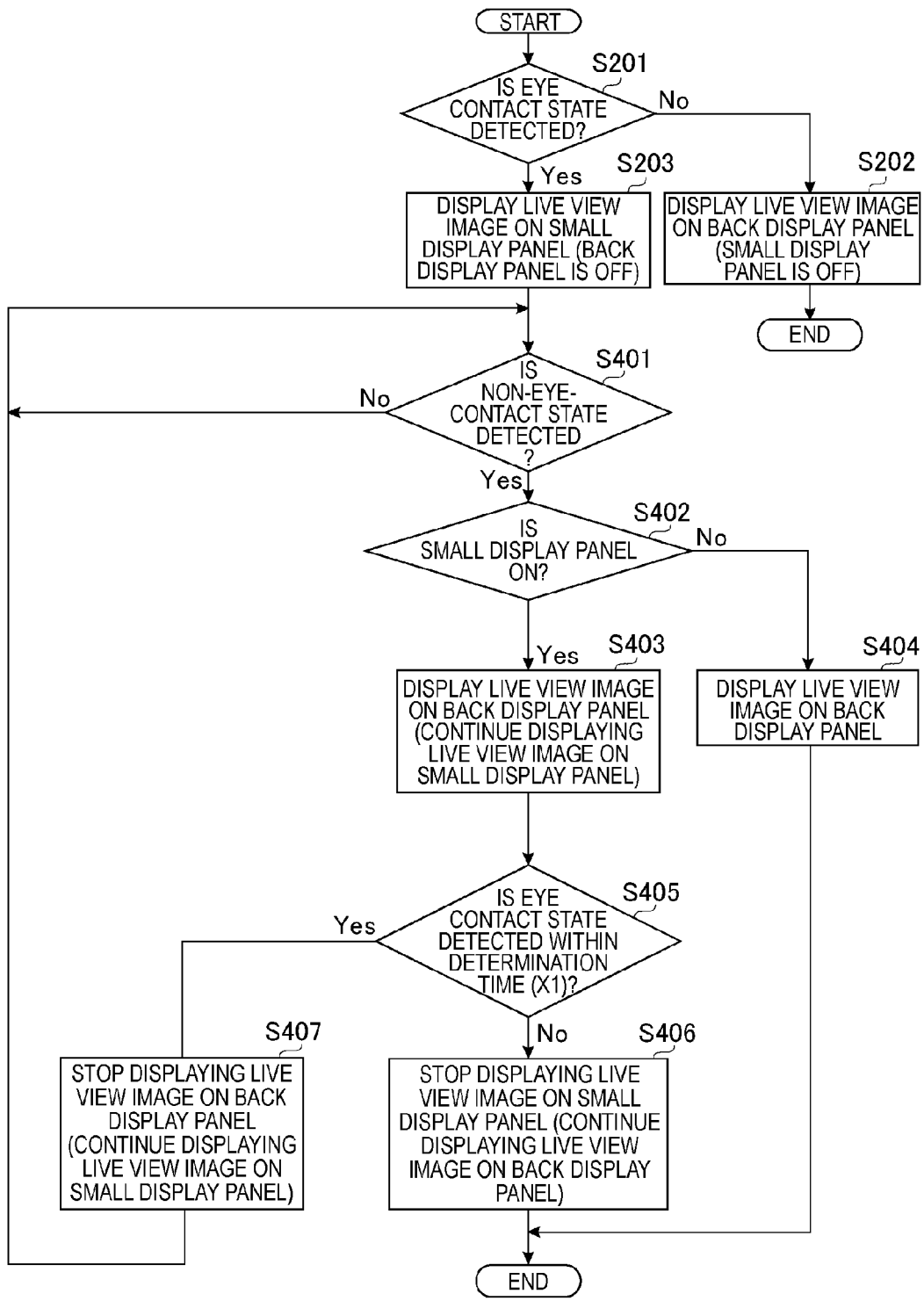
FIG. 4 is a flowchart illustrating the display processing in the imaging apparatus.

FIG. 4 is a flowchart illustrating display processing performed by an imaging apparatus 100. The imaging apparatus 100 controls displays on a back display panel 30 and a small display panel 34 in the display processing. In steps S201 to S203, processing is same as the first embodiment.

In step S401, a system control circuit 70 determines whether a state at an eyepiece viewfinder is a non-eye-contact state. More specifically, the system control circuit 70 obtains a detection result from an eyepiece detection sensor 36, and determines whether the state at the eyepiece viewfinder is an eye contact state or the non-eye-contact state based on the obtained detection result.

Next, in step S402, the system control circuit determines the display state on the small display panel 34 is ON. In the case of determining that the display state on the small display panel 34 is not ON in step S402, the system control circuit 70 proceeds to the processing in step S404. In step S404, the system control circuit 70 displays a live view image on the back display panel 30.

On the other hand, in the case of determining that the display state on the small display panel 34 is ON in step S402, the system control circuit 70 proceeds to the processing in step S403. In step S403, the system control circuit 70 displays the live view image on the back display panel 30 as well.

Next, in step S405, the system control circuit 70 determines whether the eye contact state is detected based on the detection result of the eyepiece detection sensor 36. More specifically, the system control circuit 70 determines whether the eye contact state is detected within a determination time (X1) from the time point of starting to display on the back display panel in step S403, i.e., from the time point of detecting the non-eye-contact state. Here, note that the determination time (X1) is a period preset to determine whether to stop displaying the live view image on the small display panel 34. The determination time (X1) is an example, and may be either same or different from the determination time (X1) according to the first embodiment.

In the case of determining that the eye contact state is detected in step S405, the system control circuit 70 stops displaying the live view image on the back display panel, and proceeds to the processing in step S401.

On the other hand, in the case of determining that the eye contact state is not detected in step S405, i.e., in the case where the non-eye-contact state continues during the determination time (X1) from the time point of detecting the non-eye-contact state, the system control circuit 70 proceeds to processing in step S406. In step S406, the system control circuit 70 stops displaying the live view image on the small display panel 34 which was started in step S203.

Figure 5A:
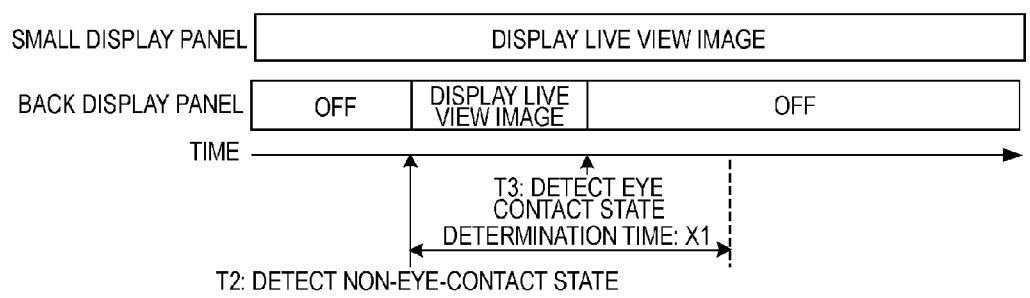
FIGS. 5A and 5B are diagrams for describing display states in the imaging apparatus.
Figure 5B:
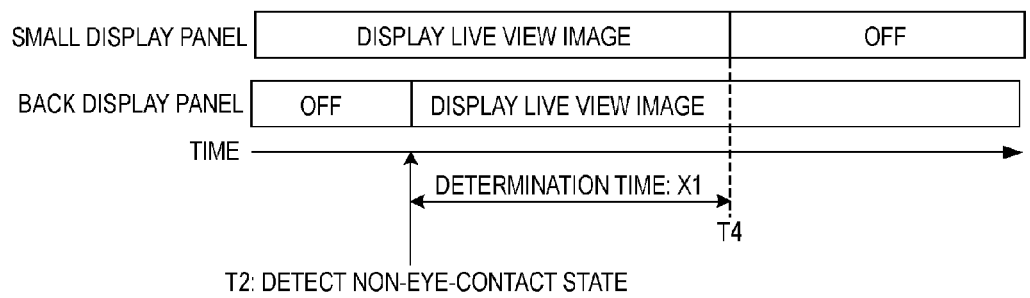

FIGS. 5A and 5B are diagrams for describing a relation between operation timings to the imaging apparatus 100 by the user and the display states on the small display panel 34 and the back display panel 30. FIGS. 5A and 5B are diagrams illustrating the display states on the small display panel 34 and the back display panel 30, in cases in which the user operates as follows. More specifically, the user first executes imaging by using the imaging apparatus 100 with his/her eye brought near the small display panel 34. Accordingly, the state at an eyepiece viewfinder is the eye contact state, and therefore the live view image is displayed on the small display panel 34.

In a first case illustrated in FIG. 5A, at time T2 when the non-eye-contact state is detected at the eyepiece viewfinder (S401, Yes), displaying the live view image on the back display panel 30 is started (S403). Then, when the user brings his/her eye near the small display panel 34 again at time T3 after detecting the non-eye-contact state at the eyepiece viewfinder, the imaging apparatus 100 detects the eye contact state at the eyepiece viewfinder. A value of "time T3-time T2" in which the state at the eyepiece viewfinder changes from the non-eye-contact state to the eye contact state is equal to or less than the determination time (X1). Accordingly, establishment conditions in step S405 are satisfied (step S405, Yes), and the system control circuit 70 finishes displaying the live view image on the back display panel 30 at time T3 (S407). At this point, displaying the live view on the small display panel 34 continues.

In a second case illustrated in FIG. 5B, when the non-eye-contact state is detected at the eyepiece viewfinder at time T2 (S401, Yes), displaying the live view image on the back display panel 30 is started (S403). Then, after detecting the non-eye-contact state at the eyepiece viewfinder, the user does not bring his/her near the small display panel 34 again during the determination time (X1), and the imaging apparatus 100 does not detect the eye contact state at the eyepiece viewfinder. At time T4 when the determination time (X1) has passed after the state at the eyepiece viewfinder had become the non-eye-contact state, the system control circuit 70 finishes displaying the live view on the small display panel 34 (S406). At this point, displaying the live view on the back display panel 30 continues.

Thus, according to each of the above-described embodiments, the imaging process can be timely started at the user's desired timing by suitably controlling the displays of the two display units.

While the preferred embodiments according to the present invention have been described, it is to be understood that the invention is not limited to the specified embodiments, and various modifications and changes may be made within the scope of the present invention recited in the scope of the claims.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-066838, filed Mar. 27, 2013, and Japanese Patent Application No. 2014-003740, filed Jan. 10, 2014, which are hereby incorporated by reference herein in their entirety.

What is claimed is:

1. An imaging apparatus including an imaging unit and an eyepiece viewfinder, comprising:
   a detection unit configured to detect whether a state at the eyepiece viewfinder is an eye contact state;
   a first display unit configured to display a live view image on a first display screen placed inside the eyepiece viewfinder when the eye contact state is detected at the eyepiece viewfinder;
   a second display unit configured to display a captured image on a second display screen outside the eyepiece viewfinder when a non-eye-contact state is detected at the eyepiece viewfinder after receiving an image shooting instruction to record the captured image on a recording medium; and
   a control unit configured to control the first display unit to continue displaying the live view image on the first screen at least during a first period from the detection of the non-eye contact state, and control the first display unit to stop displaying the live view image on the first display screen when the first period has passed if the eye contact state is not detected at the eyepiece viewfinder during the first period,
   wherein the control unit controls the second display unit to stop displaying the captured image when the eye contact state is detected before the first period has passed.

2. The imaging apparatus according to claim 1, wherein the second display unit is configured to display the captured image on the second display screen when the non-eye-contact state is detected at the eyepiece viewfinder within a second period after receiving the image shooting instruction.

3. The imaging apparatus according to claim 2, wherein the control unit controls the second display unit to stop displaying the captured image when a third period has passed from detection of the non-eye-contact state at the eyepiece viewfinder after receiving the image shooting instruction.

4. A control method for an imaging apparatus including an imaging unit and an eyepiece viewfinder, comprising:
   detecting whether a state at the eyepiece viewfinder is an eye contact state;
   displaying a live view image on a first display screen placed inside the eyepiece viewfinder when the eye contact state is detected at the eyepiece viewfinder;
   displaying a captured image on a second display screen placed outside the eyepiece viewfinder when a non-eye-contact state is detected at the eyepiece viewfinder after receiving an image shooting instruction to record the captured image on a recording medium, and furthermore continuing displaying the live view image on the first display screen;
   controlling the first displaying to continue displaying the live view image on the first screen at least during a first period from the detection of the non-eye contact state, and controlling the first displaying to stop displaying the live view image on the first display screen when the first period has passed if the eye contact state is not detected at the eyepiece viewfinder during the first period; and
   controlling the second display unit to stop displaying the captured image when the eye contact state is detected before the first period has passed.

5. A non-transitory storage medium storing a computer-readable program that causes a computer configured to control an imaging apparatus including an imaging unit and an eyepiece viewfinder to execute:

detecting whether a state at the eyepiece viewfinder is an eye contact state;

displaying a live view image on a first display screen placed inside the eyepiece viewfinder when the eye contact state is detected at the eyepiece viewfinder;

displaying a captured image on a second display screen placed outside the eyepiece viewfinder when a non-eye-contact state is detected at the eyepiece viewfinder after receiving an image shooting instruction to record the captured image on a recording medium, and furthermore continuing displaying the live view image on the first display screen;

controlling the first displaying to continue displaying the live view image on the first screen at least during a first period from the detection of the non-eye contact state, and controlling the first displaying to stop displaying the live view image on the first display screen when the first period has passed if the eye contact state is not detected at the eyepiece viewfinder during the first period; and controlling the second display unit to stop displaying the captured image when the eye contact state is detected before the first period has passed.

\* \* \* \* \*